United States Patent Office 3,657,391
Patented Apr. 18, 1972

3,657,391
GRAFT COPOLYMERS OF STYRENE, ACRYLONITRILE AND METHYL ACRYLATE ONTO DIENE POLYMERS AND BLENDS THEREOF WITH VINYL CHLORIDE RESINS
Don Carl Curfman, Washington, W. Va., assignor to Borg-Warner Corporation, Chicago, Ill.
No Drawing. Filed Mar. 12, 1969, Ser. No. 806,675
Int. Cl. C08f 41/12, 19/08
U.S. Cl. 260—876 R                                   3 Claims

ABSTRACT OF THE DISCLOSURE

A graft polymer and a method of preparing the graft polymer, which polymer is suitable for blending with poly(vinylchloride) to provide a transparent composition that exhibits transparency and an optimum balance of physical properties. The graft polymer is prepared by polymerizing styrene, acrylonitrile and methyl acrylate in the presence of a diene rubber substrate.

BACKGROUND OF INVENTION

Prior to this invention there were a great many graft polymers prepared, wherein transparency was a primary consideration, for blending with poly(vinylchloride). Many of these compositions, in fact, obtained a high degree of clarity and were found useful for a variety of commercial applications such as in bottles, containers, etc. that required at least some transparency. Many of the compositions, however, did not have sufficient impact resistance for use in many applications where bottles or containers were subjected to blows or dropping and, therefore, were found to be unsuitable for wide commercial acceptance.

SUMMARY OF INVENTION

This invention is a graft polymer that has been optimizing for use as a blending component with poly(vinylchloride) and adds high impact resistance to the poly(vinylchloride), yet retains an optimum amount of clarity.

The graft copolymer of this invention is prepared by polymerizing a mixture of a conjugated diene and a monovinylaromatic-hydrocarbon in proportions that will yield a rubbery copolymer having a refractive index substantially equal to the poly(vinylchloride) which is to be modified. The rubbery copolymer serves as a backbone of the graft polymer. A mixture of styrene, acrylonitrile and methyl acrylate are polymerized in the presence of the rubbery copolymeric backbone latex (the styrene, acrylonitrile and methyl acrylate are copolymerized in proportions to yield a polymer of substantially the same refractive index as the PVC to be modified). The resulting graft polymer is isolated and blended with poly(vinylchloride).

It is to be noted that the degree of transparency of the graft polymer is not dependent on the latex particle size of the rubbery backbone copolymer or upon the extent to which the vinyl monomers participate in grafting on the rubbery copolymer as was the case prior to the instant invention. Thus, it is possible to vary the latex particle size and the extent of grafting to provide optimum impact resistance without altering the optimum clarity as determined by matching refractive indices of the graft polymer with that of the poly(vinylchloride) to which it is added.

It has been found that the particle size of the discontinuous phase of a polymer composition containing discrete phases, must be very small or the ratio of the refractive indices of the two phases must approach unity in order to obtain a transparent composition. The refractive index of the graft polymer has been found to be generally the sum of the fractional contributions from the substrate and the polymer grafted onto it. By "polymer grafted onto it," it is meant the polymerized monomers, in this case, styrene, acrylonitrile and methyl acrylate which are chemically bonded to the substrate. Thus it is possible to prepare a graft polymer with the required refractive index by grafting monomers with a high refractive index onto a substrate of lower refractive index. This method is not new and has been extensively used; however, problems of consistency have occurred. These problems are caused by variations in the extent of grafting which is very sensitive to changes in reaction conditions and substrate latex particle size.

In accordance with this invention, it has been found that when the substrate and grafting monomers are both chosen to provide a polymer of the same refractive index as that of the given poly(vinylchloride), the final blends exhibit a higher degree of transparency and are not nearly so sensitive to variations in grafting efficiency as those graft polymers heretofore prepared.

Though it is necessary to adjust the refractive indices as set forth above to provide the proper refractive index for the resulting graft polymer, it has been found that the substrate must be limited to a rather narrow range of conjugated diene - monovinylaromatic - hydrocarbon copolymer. This is illustrated herein by butadiene-styrene copolymer. Monomers other than styrene, copolymerized with the conjugated diene to provide the copolymer substrate, are also limited to a narrow range. The conjugated diene - monovinylaromatic hydrocarbon backbone substrate comprises from about 50–60% of the total graft copolymer and correspondingly the grafting monomers will comprise from about 50–40% of the total graft copolymer. The conjugated diene of the substrate may vary within a range of 73% to 70% and correspondingly the monovinylaromatic-hydrocarbon may vary from a range of 27 to 30%. The conjugated diene illustrated in the examples is butadiene and comprises approximately 70% of the total substrate copolymer and the monovinylaromatic-hydrocarbon illustrated by styrene from the examples is correspondingly 30% of the total copolymeric substrate.

The grafting monomers utilized in preparing the graft polymer of this invention are illustrated as acrylonitrile, styrene and methyl acrylate. The preferred monomers are acrylonitrile or substituted acrylonitrile, styrene or methyl styrene or the like and methyl acrylate. It will be shown in the examples that one of the graft polymers is prepared utilizing methylmethacrylate as one of the grafting monomers in place of methyl acrylate. The polymer using methylmethacrylate is, however, outside the scope of this invention and there is an undesirable loss in impact strength through use of methylmethacrylate.

SUBSTRATE COPOLYMER PREPARATION—TABLE I

In preparation of the backbone copolymer, a typical recipe is set forth herein below:

| Materials used | Parts by wt. | Wt. used |
|---|---|---|
| Water (demineralized) | 150.00 | 2,206.8 |
| K₂S₂O₈ | 0.06 | .9 |
| Tetra sodium pyrophosphate | 0.1 | 1.5 |
| Sodium dodecyldiphenyl ether disulfonate (51% active) | ¹3.0 | 88.2 |
| Styrene | 30.0 | 450.0 |
| Tert-dodecyl mercaptan | 0.25 | 3.75 |
| Butadiene | 70.0 | 1,050.0 |

¹ Active.

The first four materials were combined and mixed to effect solution. The solution was charged to a 5 liter stainless steel autoclave and, thereafter, the styrene tert-dodecyl mercaptan was mixed, and this mixture and the butadiene was charged and the autoclave sealed and heated to 50° C. and maintained at that temperature for about 18 hours. The temperature was thereafter raised slowly to about 65° C. for an additional 5 hours. The latex resulting from this polymerization contained 36% total solids (about 87% conversion). The refractive index of a cast film was 1.5394 $N_0 25°$ indicating approximately 29% bound styrene.

A series of rubbery polymeric substrates, A–D inclusive, were prepared as set forth in Table I above. Table II hereinbelow discloses the compositions of these substrates and the amount of bound styrene in the substrate.

TABLE II

| Substrate | A | B | C | D |
|---|---|---|---|---|
| Charge monomers: | | | | |
| Butadiene | 70 | 75 | 80 | 85 |
| Styrene | 30 | 25 | 20 | 15 |
| Percent styrene in product | 28.0 | 24.6 | 19.2 | 11.1 |

PREPARATION OF GRAFT COPOLYMER—TABLE III

A graft polymer was prepared using the recipe set forth hereinbelow (Table III) and the procedure that follows the recipe. Graft polymers were prepared from the rubbery polymeric substrates of Substrate A through D in the manner set forth in the receipe following Table III and the reactions were conducted in batch, i.e., all of the reactants were added at once. The resultant graft polymers were blended with PVC in Examples 1 through 4 set forth in Table IV herein below.

| Materials: | Parts by Wt. |
|---|---|
| Water (demineralized) | 180 |
| Rubbery copolymer latex from 1 | 50 |
| Sodium dodecyldiphenyl ether disulfonate | 1.0 |
| Sodium formaldehyde sulfoxylate | .15 |
| Ethylenediaminetetracetic acid | .045 |
| $FeSO_4 \cdot 7H_2O$ | .15 |
| Styrene | 27 |
| Acrylonitrile | 13 |
| Methyl acrylate | 10 |
| Tert-dodecyl mercaptan | 0.5 |
| Cumene hydroperoxide | 0.3 |

The sodium formaldehyde sulfoxylate, ethylenediaminetetracetic acid and ferrous sulfate were dissolved in a portion of the water and the sodium dodecyldiphenyl ether disulfonate was dissolved in the balance of the water. The two solutions were combined with the co-polymer latex and charged to a bottle. The monomers were mixed with the tert-dodecyl mercaptan and cumene hydroperoxide and charged to the bottle. The bottle was tumbled at 60° C. over a period of 2 hours.

An antioxidant emulsion was added to the latex and it was coagulated in water containing aluminum sulphate, filtered, washed and dried. The graft polymer was blended with poly(vinylchloride) by milling on a two-roll mill maintained at a temperature of 300° F. for 10 minutes. The thus blended product was compression molded into sample test pieces. Table IV gives the percentages of the graft polymer and PVC as well as the physical characteristics of the test pieces of the blended product.

PREPARATION OF PVC BLENDS—TABLE IV

| | Example | | | |
|---|---|---|---|---|
| | 1 | 2 | 3 | 4 |
| Substrate | A | B | C | D |
| Percent graft polymer [1] | 15 | 15 | 15 | 15 |
| Percent PVC [2] | 85 | 85 | 85 | 85 |
| Properties: | | | | |
| Notched Izod Impact (ft. lb./in.), ⅛″ sample, 23C | 12.9 | 18.1 | 15.9 | 11.7 |
| Hardness, Rockwell | 108 | 108 | 108 | 108 |
| Percent light transmittance (520 mμ; 0.125″ sample) [3] | 72 | 69 | 62 | 56 |

[1] Made according to the above graft polymer recipe using the substrates of Examples A, B, C, and D.
[2] Pliovic S-50 (Goodyear Tire and Rubber Co.), ASTM Group I—low molecular weight poly(vinylchloride) with an inherent viscosity of 0.69.
[3] 520 mμ—light transmittance is measured by the percent of light passing through a given thickness sample. The 520 mμ above refers to millimicrons wavelength of light and the 0.125″ is a sample of 125 mils thickness.

Four other graft polymers were prepared based on Substrate A and these polymers were blended with PVC in the same manner as hereinbefore described. The graft polymers and blends and the physical characteristics thereof are set forth in Table V herein below.

TABLE V

| Example | 5 | 6 | 7 |
|---|---|---|---|
| Rubbery substrate: | | | |
| Butadiene/styrene ratio | 70/30 | 70/30 | 70/30 |
| Styrene content (wt. percent) | 28 | 28 | 28 |
| Graft composition (wt. percent): | | | |
| Rubbery substrate | 50 | 57 | 64 |
| Styrene | 27 | 23.2 | 19.4 |
| Acrylonitrile | 13 | 11.2 | 9.4 |
| Methyl acrylate | 10 | 8.6 | 7.2 |
| Resin properties: | | | |
| Hardness, Shore D | 67 | 62 | 54 |
| Percent light transmittance (at 520mμ and 0.125″) | 64 | 61 | 57 |
| Inherent viscosity of soluble polymer (0.2 g./ 100 ml. $CHCl_3$) | 0.51 | 0.50 | 0.34 |
| Blend properties (all 85/15 PVC [1]/graft polymers): | | | |
| Notched Izod Impact (ft. lb./in.), ⅛″ sample | 15.2 | 16.2 | 17.6 |
| Hardness, Rockwell | 105 | 103 | 103 |
| Percent light transmittance (at 520 mμ and 0.125″) | 70 | 73 | 72 |
| (90/10 poly(vinylchloride)/graft polymer Bottle Drop Test (mean failure height filled with water) | 8 | 10 | 14 |

[1] See footnote 2, Table IV.

A second series of graft polymers were prepared in accordance with the recipe set forth hereinabove for the preparation of graft polymer with the monomer ratio varied. These compositions and their physical properties are set forth in Table VI below. All of the rubbery substrates are 70/30 butadiene/styrene copolymers. Table VI illustrates that highly desirable properties may be obtained with different ratios of monomers and with ethylacrylate substituted for methyl acrylate. It will be noted that the methylmethacrylate graft polymer/PVC blend exhibits poorer impact resistance than that of the methylacrylate graft polymer/PVC blends of the present invention.

TABLE VI

| Example | 8 | 9 | 10 | 11 | 12 |
|---|---|---|---|---|---|
| Graft copolymers (wt. percent) | | | | | |
| SBR | 50 | 50 | 50 | 50 | 50 |
| Styrene | 27 | 27 | 27 | 23 | 25 |
| Acrylonitrile | 13 | 13 | 13 | 11 | 12 |
| Methyl acrylate | 10 | | | 16 | 13 |
| Ethyl arylate | | 10 | | | |
| Methylmethacrylate | | | 10 | | |
| Blend properties (85/15 PVC/graft ratios): | | | | | |
| Notched Izod Impact (ft. lb./in.), ⅛″ sample, 23C | 15.2 | 14.0 | 8.2 | 15.6 | 18.9 |
| Hardness, Rockwell | 109 | 106 | 111 | 108 | 108 |
| Percent light transmittance (520 mμ at 0.125″) | 66 | 65 | 69 | 75 | 72 |

Poly(vinylchloride) was modified with varying amounts of graft copolymer of this invention and the physical properties of the blended composition are set forth in Examples 14 through 17 in Table VII hereinbelow. Example 13 is the control wherein the poly(vinylchloride) is measured for physical properties by itself and Example 18 is the control for illustrating the physical properties of the graft copolymer by itself. The graft polymer used in the example of Table VII was prepared by polymerizing 20.6% styrene, 9.9% acrylonitrile and 12.5% methyl acrylate in the presence of 57% of Substrate A.

TABLE VII

| Example | 13 | 14 | 15 | 16 | 17 | 18 |
|---|---|---|---|---|---|---|
| Pliovic S-50 (Goodyear) [poly(vinylchloride)] | 100.0 | 95.0 | 90.0 | 85.0 | 80.0 | |
| Graft copolymer | | 5.0 | 10.0 | 15.0 | 20.0 | 100 |
| Thermolite 35 | 2.0 | 2.0 | 2.0 | 2.0 | 2.0 | |
| Calcium stearate | 1.0 | 1.0 | 1.0 | 1.0 | 1.0 | |
| Physical properties: | | | | | | |
| Notched Izod Impact (⅛" sample) (ft. lb./in.), 23C | 1.4 | 2.0 | 18.5 | 18.1 | 16.8 | 8.8 |
| Tensile strength (p.s.i.) | 7,950 | 7,500 | 6,900 | 6,400 | 6,300 | 2,200 |
| Tensile elongation (percent) | 166 | 220 | 175 | 155 | 209 | 450 |
| Tensile modulus (p.s.i.×10⁵) | 4.6 | 3.7 | 3.8 | 3.5 | 3.4 | 0.8 |
| Flexural strength (p.s.i.) | 13,800 | 12,750 | 11,300 | 10,550 | 10,800 | |
| Flexural modulus (p.s.i.×10⁵) | 4.8 | 4.3 | 3.8 | 3.5 | 3.6 | |
| Heat distortion (F°) (½×½ 264 p.s.i.)¹ | 166 | 171 | 168 | 168 | 168 | |
| Heat distortion (F°) (½×½ 264 p.s.i.)² | 170 | 168 | 168 | 167 | 179 | |
| Percent light transmittance (530 mμ 0.070") | 81 | 76 | 91 | 93 | 87 | 97 |

¹ Compression molded unannealed.
² Compression molded annealed.

The poly(vinylchloride) illustrating the invention herein is a low molecular weight compound that exhibits good light transmittance; however, it is used for illustrative purposes only. Vinylchloride copolymers may also be used. These copolymers may contain at least 80% by weight vinylchloride copolymerized with monomers such as ethylene, vinylacetate, vinylidene chloride, acrylonitrile, vinyl ether, acrylic ester, methacrylic ester, propylene, styrene and the like.

It will be understood that while this invention has been described in connection with certain specific compositions and blends thereof, these serve as illustration of the invention and are not meant to in any way limit the scope of the invention. The scope of the invention is defined solely by the appended claims which should be construed as broadly as is consistent with the prior art.

I claim:
1. A transparent thermoplastic graft copolymer-PVC blend wherein said graft copolymer is prepared by polymerizing a mixture of 50–40% by weight of a monomer composition consisting of 46–54% by weight styrene, 22–26% by weight acrylonitrile and 20–32% by weight methyl acrylate in the presence of from 50–60% by weight of a butadiene/styrene substrate wherein the substrate consists of 70–73% by weight butadiene and 30–25% by weight styrene and wherein the graft polymer is blended with poly(vinyl chloride) homopolymers and vinyl chloride copolymers containing at least 80% by weight vinyl chloride and wherein the refractive index of the graft polymer is substantially the same as that of the refractive index of the poly(vinyl chloride) composition to thereby provide a transparent blend.

2. The transparent thermoplastic blend of claim 1 wherein the graft polymer portion contains 10–20% by weight of the total composition and the poly(vinyl chloride) component comprises 90–80% by weight of the total composition.

3. The transparent thermoplastic blend of claim 1 wherein the vinyl chloride copolymer is prepared by polymerizing at least 80% vinyl chloride with at least one monomer selected from the group consisting of ethylene, vinylacetate, vinylidene chloride, acrylonitrile, vinyl ether, acrylic ester, methacrylic ester, propylene and styrene.

References Cited

UNITED STATES PATENTS

| 3,287,443 | 11/1966 | Saito et al. | 260—876 |
| 3,316,327 | 4/1967 | Baer et al. | 260—876 |
| 3,557,251 | 1/1971 | Tanaka et al. | 260—876 |

FOREIGN PATENTS

| 5,225 | 3/1965 | Japan | 260—880 |
| 937,747 | 9/1963 | Great Britain | 260—876 |
| 994,924 | 6/1965 | Great Britain | 260—876 |
| 1,039,728 | 8/1966 | Great Britain | 260—880 |

MURRAY TILLMAN, Primary Examiner

H. W. ROBERTS, Assistant Examiner

U.S. Cl. X.R.

260—23.7 H, 880 R

UNITED STATES PATENT OFFICE
CERTIFICATE OF CORRECTION

Patent No. 3,657,391             Dated  April 18, 1972

Inventor(s) Don Carl Curfman

It is certified that error appears in the above-identified patent and that said Letters Patent are hereby corrected as shown below:

Column 1, lines 1 and 2, under the heading "SUMMARY OF INVENTION", "optimizing" should read -- optimized -- . Column 3, line 3, after "styrene", insert -- and -- ; line 4, "was" should read -- were -- ; line 11, "$N_O25°$" should read -- $N_D25°$ -- .

Signed and sealed this 2nd day of January 1973.

(SEAL)
Attest:

EDWARD M. FLETCHER, JR.                ROBERT GOTTSCHALK
Attesting Officer                       Commissioner of Patents